United States Patent
Lee

(10) Patent No.: US 9,754,553 B2
(45) Date of Patent: Sep. 5, 2017

(54) ELECTRONIC DEVICE AND METHOD OF CONTROLLING A SCREEN OF AN EXTERNAL ELECTRONIC DEVICE

(71) Applicant: Samsung Electronics Co., Ltd., Gyeonggi-do (KR)

(72) Inventor: Hwa-Jun Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/687,560

(22) Filed: Apr. 15, 2015

(65) Prior Publication Data

US 2015/0302823 A1 Oct. 22, 2015

(30) Foreign Application Priority Data

Apr. 21, 2014 (KR) ........................ 10-2014-0047583

(51) Int. Cl.
G09G 5/00 (2006.01)
G06F 3/14 (2006.01)
G06F 3/0488 (2013.01)
G06F 1/32 (2006.01)
H04M 1/725 (2006.01)

(52) U.S. Cl.
CPC .......... *G09G 5/006* (2013.01); *G06F 1/3209* (2013.01); *G06F 1/3228* (2013.01); *G06F 1/3265* (2013.01); *G06F 3/0488* (2013.01); *G06F 3/14* (2013.01); *H04M 1/7253* (2013.01); *G06F 2203/0383* (2013.01); *G09G 2370/06* (2013.01); *H04M 2250/64* (2013.01); *Y02B 60/1242* (2013.01)

(58) Field of Classification Search
None
See application file for complete search history.

(56) References Cited

U.S. PATENT DOCUMENTS

| 7,616,761 | B1 | 11/2009 | Sin |
| 2010/0165965 | A1 | 7/2010 | Carlton et al. |
| 2010/0325306 | A1 | 12/2010 | Vimpari et al. |
| 2012/0064948 | A1 | 3/2012 | Lee et al. |
| 2012/0137217 | A1* | 5/2012 | Amsterdam .......... G06F 1/3228 715/256 |
| 2014/0359435 | A1* | 12/2014 | Zheng .................. G06F 3/0488 715/702 |

FOREIGN PATENT DOCUMENTS

| EP | 2 657 830 | 10/2013 |
| KR | 10-2012-0077605 | 7/2012 |
| KR | 10-2013-0066657 | 6/2013 |
| WO | WO 2004/023767 | 3/2004 |

OTHER PUBLICATIONS

European Search Report dated Sep. 7, 2015 issued in counterpart application No. 15164243.6-1959, 9 pages.

* cited by examiner

*Primary Examiner* — Joseph Haley
(74) *Attorney, Agent, or Firm* — The Farrell Law Firm, P.C.

(57) ABSTRACT

An electronic device and method of controlling a screen of an external electronic device are provided. The method includes connecting with the external electronic device; determining whether a screen control event for controlling the screen of the external electronic device is generated; and transmitting screen control information corresponding to the screen control event to the external electronic device, if the screen control event is generated.

10 Claims, 5 Drawing Sheets

| SCREEN CONTROL EVENT | SCREEN TIMEOUT TIME PERIOD |
|---|---|
| DATA TRANSMISSION COMPLETION EVENT | 3 SEC. |
| FUNCTION SETTING VALUE CHANGE EVENT | TIME PERIOD PREVIOUSLY SET BY USER |
| LIVE WALLPAPER SETTING CHANGE EVENT | 5SEC. |
| SOFTWARE UPDATE EVENT | 3SEC. |
| APPLICATION INSTALLATION EVENT | 3SEC. |
| INPUT EVENT | TIME PERIOD PREVIOUSLY SET BY USER |
| CONNECTION/DISCONNECTION EVENT | 3SEC. |
| MUSIC CONTROL EVENT | 5SEC. |

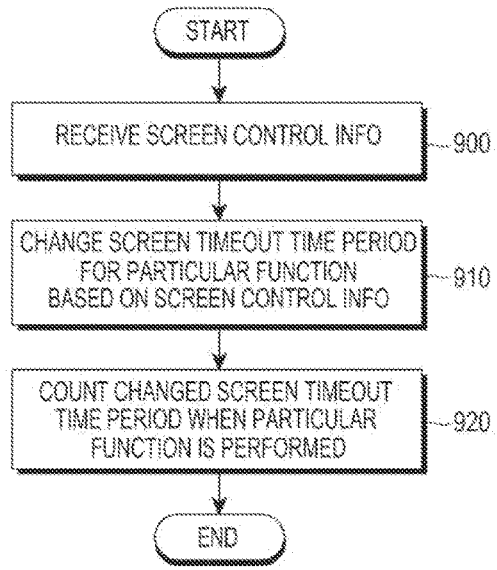

FIG.9

| SCREEN CONTROL EVENT | SCREEN TIMEOUT TIME PERIOD |
|---|---|
| DATA TRANSMISSION COMPLETION EVENT | 3 SEC. |
| FUNCTION SETTING VALUE CHANGE EVENT | TIME PERIOD PREVIOUSLY SET BY USER |
| LIVE WALLPAPER SETTING CHANGE EVENT | 5 SEC. |
| SOFTWARE UPDATE EVENT | 3 SEC. |
| APPLICATION INSTALLATION EVENT | 3 SEC. |
| INPUT EVENT | TIME PERIOD PREVIOUSLY SET BY USER |
| CONNECTION/DISCONNECTION EVENT | 3 SEC. |
| MUSIC CONTROL EVENT | 5 SEC. |

FIG.10

ELECTRONIC DEVICE AND METHOD OF CONTROLLING A SCREEN OF AN EXTERNAL ELECTRONIC DEVICE

PRIORITY

This application claims priority under 35 U.S.C. §119(a) to Korean Application Serial No. 10-2014-0047583, which was filed in the Korean Intellectual Property Office on Apr. 21, 2014, the entire content of which is incorporated herein by reference.

BACKGROUND

1. Field of the Invention

The present invention relates generally to an electronic device, and more particularly to a configuration for controlling a screen thereof.

2. Description of the Related Art

Commonly, when a portable device including a touch screen does not receive any input for a predetermined time during a standby state, the portable device stops providing power to the screen thereof, and no longer displays data on the screen. Basically, when the portable device does not receive any input from a user during a predetermined time period, the screen or functions of the portable device are deactivated.

However, when the portable device is connected to another electronic device, and then acts as an external electronic device, after the screen or functions of the external portable device are deactivated, the external electronic device does not perform any operation in response to events generated in the another electronic device.

SUMMARY

The present invention has been made to address at least the problems and/or disadvantages described above and to provide at least the advantages described below.

An aspect of the present invention is to provide a method of controlling a screen of an external electronic device connected to an electronic device of a user, and the electronic device.

Another aspect of the present invention is to provide a method for controlling an electronic device in which, when a screen control event for controlling a screen is generated in the electronic device, the electronic device controls a screen of an external electronic device, to which the electronic device is connected, and enables a user to directly identify control over the screen of the external electronic device.

Another aspect of the present invention is to provide a method for controlling an electronic device in which the electronic device can perform various screen controls according to the screen control event, and can save power of a battery according to the setting of various screen timeout time periods.

In accordance with an aspect of the present invention, a method of controlling a screen of an external electronic device by an electronic device is provided. The method includes connecting with the external electronic device; determining whether a screen control event for controlling the screen of the external electronic device is generated; and transmitting screen control information corresponding to the screen control event to the external electronic device if the screen control event is generated.

In accordance with another aspect of the present invention, an electronic device is provided. The electronic device includes a communication interface that connects the electronic device with an external electronic device; and a processor that determines whether a screen control event for controlling a screen of the external electronic device is generated, and controls the communication interface to transmit, to the external electronic device, screen control information corresponding to the screen control event, when the screen control event is generated.

In accordance with another aspect of the present invention, a method of controlling a screen in an external electronic device is provided. The method includes connecting with an electronic device; receiving, from the electronic device, screen control information for controlling the screen of the external electronic device; and changing a setting of the screen of the external electronic device according to the received screen control information.

In accordance with another aspect of the present invention, an external electronic device is provided. The external electronic device includes a communication interface that connects with an electronic device; and a processor that changes a setting of a screen of the external electronic device according to received screen control information, when the screen control information s received from the electronic device through the communication interface.

BRIEF DESCRIPTION OF THE DRAWINGS

The above and other aspects, features, and advantages of certain embodiments of the present invention will be more apparent from the following detailed description taken in conjunction with the accompanying drawings, in which:

FIG. 9 is a flowchart illustrating a process for controlling a screen of an external electronic device according to an embodiment of the present invention; and FIG. 10 is a table illustrating examples of screen timeout time periods matched to screen control events according to an embodiment of the present invention.

DETAILED DESCRIPTION OF EMBODIMENTS OF THE INVENTION

Figure 1:
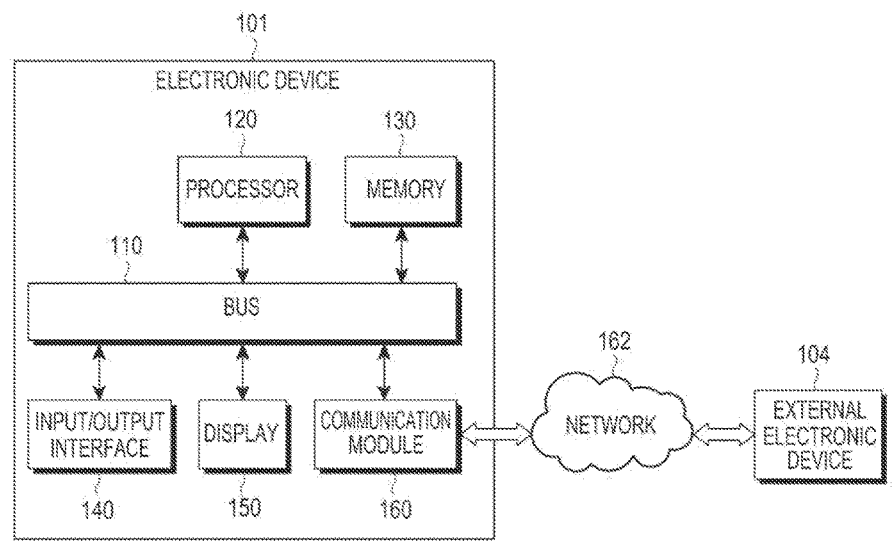
FIG. 1 illustrates a network environment including an electronic device and an external electronic device according to an embodiment of the present invention.

Hereinafter, various embodiments of the present invention will be described with reference to the accompanying drawings. However, the present invention may be modified in various forms and include various embodiments. Although specific examples are illustrated in the drawings and described in the description, it should be understood that there is no intent to limit the present invention to the particular forms described herein, but on the contrary, the present invention covers all modifications, equivalents, and/or alternatives falling within the spirit and scope of the invention. In describing the drawings, similar elements are designated by similar reference numerals.

The terms "include" or "may include", which may be used in various embodiments of the present disclosure, refer to the presence of disclosed functions, operations or elements, and do not restrict the addition of one or more functions, operations or elements. Further, it should be understood that the terms "include" or "have" in various embodiments of the present disclosure refer to the presence of features, numbers, steps, operations, elements or components or a combination thereof, which are described in the specification, and do not rule out the presence or the addition of features, numbers, steps, operations, elements or components or a combination thereof.

The term "or" in various embodiments of the disclosure means the inclusion of at least one or all of the disclosed elements. For example, the expression "A or B" may include A, may include B, or may include both A and B.

The expressions such as "first," "second," etc., used in various embodiments of the present invention may modify various component elements in the various embodiments but should not limit corresponding component elements. For example, the above expressions do not limit the sequence and/or importance of the elements. The above expressions may be used merely for the purpose to distinguish a constituent element from other constituent elements. For example, a first user device and a second user device indicate different user devices although both of them are user devices. For example, without departing from the scope of the present invention, a first structural element may be named a second structural element. Similarly, the second structural element also may be named the first structural element.

When a component is referred to as being "connected to" or "accessed by" any other component, it should be understood that the component may be directly connected to or accessed by the other component, or that another new component may also be interposed between them. Contrarily, when a component is referred to as being "directly connected to" or "directly accessed by" any other component, it should be understood that there is no new component between the component and the other component.

The terms used in various embodiments of the present invention are merely used to describe certain embodiments and should not limit the present element. Singular forms are intended to include plural forms unless the context clearly indicates otherwise.

Unless defined differently, all terms used herein, which include technical terminologies or scientific terminologies, have the same meaning as understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

Herein, an electronic device as described in the various embodiments of the present invention may be at least one of a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, a wearable device, such as a head-mounted-device (HMD), e.g., electronic glasses, a piece of electronic clothing, an electronic bracelet, an electronic necklace, an electronic appcessory, an electronic tattoo, or a smart watch.

Further, an electronic device may be a smart home appliance with a display function, e.g., at least one of a television, a Digital Video Disk (DVD) player, an audio player, a refrigerator, an air conditioner, a vacuum cleaner, an oven, a microwave oven, a washing machine, an air purifier, a set-top box, a TV box (e.g., Samsung HomeSync®, Apple TV®, or Google TV®), a game console, an electronic dictionary, an electronic key, a camcorder, or an electronic picture frame.

The electronic device may also include at least one of various medical appliances, e.g., a Magnetic Resonance Angiography (MRA) machine, a Magnetic Resonance Imaging (MRI) machine, a Computed Tomography (CT) machine, and an ultrasonic machine, navigation devices, Global Positioning System (GPS) receivers, Event Data Recorders (EDRs), Flight Data Recorders (FDRs), automotive infotainment devices, electronic equipment for ships, e.g., navigation equipment for ships, gyrocompasses, etc., avionics devices, security devices, head units for vehicles, industrial or home robots, Automatic Teller Machines (ATMs) of banks, and Point Of Sale (POS) devices.

The electronic device may also include furniture, a part of a building/structure, an electronic board, an electronic signature receiving device, a projector, or various types of measuring devices, e.g., a water meter, an electricity meter, a gas meter, a radio wave meter, etc.

In addition, the electronic device may be a flexible device.

Further, the electronic device may be a combination of any of the above-described devices.

It is obvious to a person having ordinary skill in the art that the electronic device of the present invention is not limited to the above-described devices.

Herein, the term "user" may refer to a person who uses an electronic device or may refer to a device, e.g., an artificial intelligence electronic device that uses an electronic device.

FIG. 1 illustrates a network environment including an electronic device and an external electronic device according to an embodiment of the present invention.

Referring to FIG. 1, an electronic device 101 may include a bus 110, a processor 120, a memory 130, an input/output interface 140, a display 150, and a communication interface 160.

The bus 110, e.g., a circuit, may interconnect the above-described elements and delivers communications (e.g., a control message) between the above-described elements.

The processor 120 may receive commands from the other elements through the bus 110, may interpret the received commands, and may execute calculations or data processing according to the interpreted commands.

The processor 120 establishes a communication connection to an external electronic device 104 through the communication interface 160, and determines whether a screen control event for controlling a screen of the external electronic device 104 is generated. For example, the screen control event may include an event that changes a function setting of the electronic device 101, an input event through the input/output interface 140, an event that completes data transmission to the external electronic device 104, etc. For example, the input event may be a touch gesture, a throw gesture, a long-press gesture, etc.

If a screen control event is generated, the processor 120 transmits screen control information on the generated screen control event to the external electronic device 104. The screen control information is used to control the screen of the external electronic device 104 corresponding to the screen control event. For example, the screen control information may include information on a changed function setting of the electronic device 101, input information, information indicating the completion of data transmission, etc.

Accordingly, the external electronic device 104 may change a screen setting thereof by using the received screen control information. For example, the external electronic device 104 may change a screen timeout time period in response to the changed function setting thereof and recounts the changed screen timeout time period, or may change a power-off state of the screen to a power-on state of the screen.

The memory 130 may store commands and/or data received from the processor 120 or the other elements, or generated by the processor 120 or the other elements. For example, the memory 130 may include programming modules, such as a kernel, middleware, an Application Programming Interface (API), an application, etc. Each of the above-described programming modules may be implemented in software, firmware, hardware, or a combination of two or more thereof. Particularly, the application may be various applications. Additionally or alternatively, the application may be related to information exchange between the electronic device 101 and the external electronic device 104.

Examples of the application related to information exchange may include a notification relay application for delivering particular information to the external electronic device 104, and a device management application for managing the external electronic device 104.

The device management application may manage, for example, a function (e.g., turn-on/off of the external electronic device 104 itself (or some components), or adjustment of the brightness (or resolution) of the display) of at least a part of the external electronic device 104 communicating with the electronic device 101, an application operating in the external electronic device 104, or a service provided by the external electronic device 104.

According to an embodiment of the present invention, the application may include an application designated by an attribute of the external electronic device 104, e.g., a type of the electronic device.

According to an embodiment of the present invention, the application may include at least one of an application designated for the electronic device 101 and an application received from the external electronic device 104.

The input/output interface 140 may deliver a command and/or data, which has been received as input from a user through an input/output unit (e.g., a sensor, a keyboard, or a touch screen), to the processor 120, the memory 130, the display 150, and the communication interface 160 through the bus 110. For example, the input/output interface 140 may provide the processor 120 with data corresponding to a touch of the user received as input through a touch screen.

Also, the input/output interface 140 may output a command and/or data, which has been received from the processor 120, the memory 130, or the communication interface 160 through the bus 110, through an input/output unit (e.g., a speaker or a display). For example, the input/output interface 140 may output voice data processed by the processor 120 to the user through a speaker.

The display 150 may display various information (e.g., multimedia data, text data, etc.) to a user.

The communication interface 160 may connect the electronic device 101 and the external electronic device 104. For example, the communication interface 160 may be connected to a network 162 through wireless or wired communication, and may communicate with the external electronic device 104 through the network 162. Herein, the wireless communication may include but is not limited to Wi-Fi, Bluetooth® (BT), Near Field Communication (NFC), Global Positioning System (GPS) and cellular communication (e.g., Long Term Evolution (LTE), LTE-Advanced (LTE-A), Code Division Multiple Access (CDMA), Wideband CDMA (WCDMA), Universal Mobile Telecommunication System (UMTS), Wireless Broadband (WiBro), Global System for Mobile Communications (GSM), etc).

The wired communication may include, but is not limited to, a Universal Serial Bus (USB), a High Definition Multimedia Interface (HDMI), Recommended Standard 232 (RS-232), and a Plain Old Telephone Service (POTS).

According to an embodiment of the present invention, the network 162 may be a communication network, which includes, for example, at least one of a computer network, the Internet, the Internet of things, and a telephone network.

Figure 2:
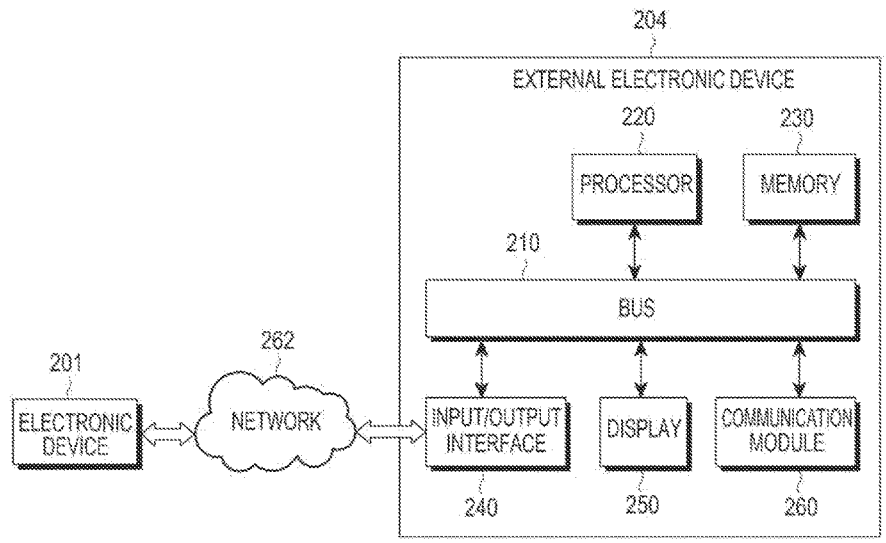
FIG. 2 illustrates a network environment including an electronic device and an external electronic device according to an embodiment of the present invention.

FIG. 2 illustrates a network environment including an electronic device and an external electronic device according to an embodiment of the present invention.

Referring to FIG. 2, an external electronic device 204 may include a bus 210, a processor 220, a memory 230, an input/output interface 240, a display 250, and a communication interface 260.

The bus 210, e.g., a circuit, may interconnect the illustrated elements of the external electronic device 204 and deliver communications (e.g., a control message) between the elements.

The processor 220 may receive commands from the other elements through the bus 210, interpret the received commands, and execute calculations or data processing according to the interpreted commands.

When receiving screen control information from an electronic device 201 through the communication interface 260, the processor 220 changes a screen setting, based on the received screen control information.

For example, when the screen control information is received from the electronic device 201 while a screen timeout time period is counted in a power-on state of the screen, the processor 220 recounts the screen timeout time period. The screen timeout time period signifies a preset time period from a time point of a power-on of the screen to a time point of a power-off thereof.

For example, when screen control information including a changed setting value of a clock function is received while a screen timeout time period of 10 seconds is counted in a power-on state of the screen, the processor 220 may reflect the changed setting value of the clock function, and then may recount the screen timeout time period of 10 seconds. That is, the processor 220 may recount the screen timeout time period of 10 seconds while displaying, on the display 250, a clock in which the changed setting value is reflected.

When screen control information is received from the electronic device 101 in a power-off state of the screen, the processor 220 changes the screen from the power-off state to a power-on state. Here, the power-off state of the screen signifies a state in which the supply of power to the display 250 is stopped and the display 250 is no longer displaying a background screen. The power-on state of the screen signifies a state in which power is supplied to the display 250 and the display 250 is capable of displaying the background screen.

When the screen control information is received, the processor 220 changes a screen timeout time period for a particular function based on the received screen control information, and counts the changed screen timeout time period when the particular function is performed. For example, when a changed setting value of a wallpaper function is received from the electronic device 201, the processor 220 may store the changed setting value of the wallpaper function in the memory 230, and may change a screen timeout time period to a time period appropriate for displaying wallpaper when the wallpaper function is performed.

Alternatively, when a changed setting value of the wallpaper function received from the electronic device 201 is 5 seconds in a state in which a screen timeout time period for a wallpaper is defaulted to 10 seconds, the processor 220 may change the screen timeout time period for the wallpaper to 5 seconds, may count the screen timeout time period of 5 seconds from a time point of displaying the wallpaper on the screen, and may turn off power of the screen when the count of 5 seconds is completed.

The screen timeout time periods and the changed setting values of 10 seconds and 5 seconds, respectively, are merely examples, and the screen timeout time periods and the changed setting values may be set to other various time periods.

The memory 230 may store commands and/or data received from the processor 220 or other elements.

The input/output interface 240 may deliver a command or data, which has been received as input from a user through an input/output unit (e.g., a sensor, a keyboard, or a touch screen), to the processor 220, the memory 230, the display 250, and the communication interface 260 through the bus 210.

The display 250 may display various pieces of information (e.g., multimedia data, text data, etc.) to a user.

The communication interface 260 may connect the electronic device 201 and the external electronic device 204, e.g., through a network 262.

Figure 3:
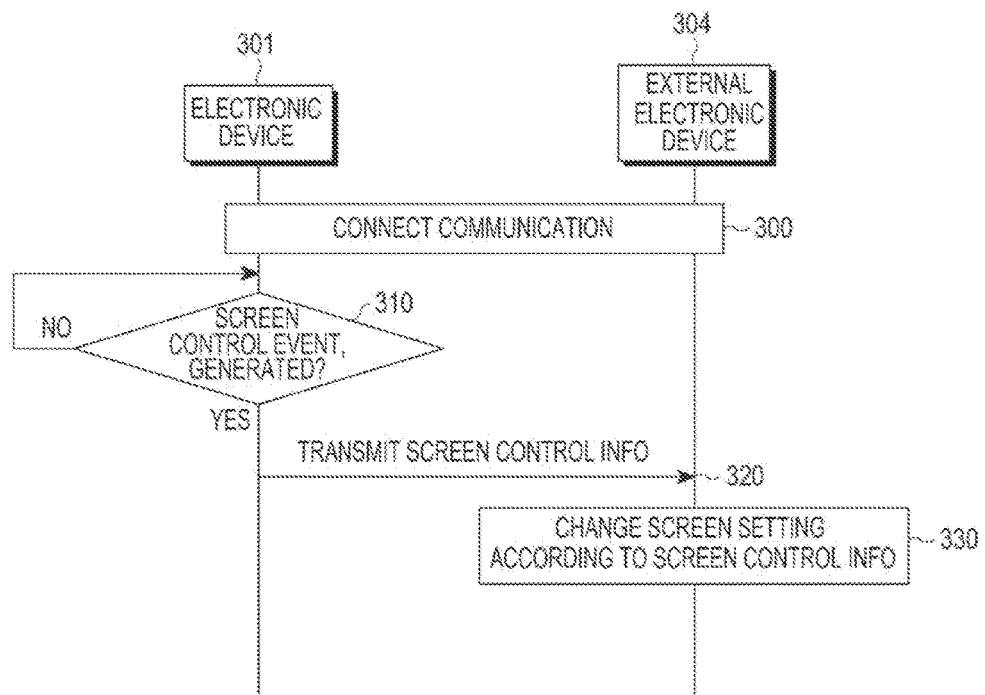
FIG. 3 is a signal flow diagram illustrating a process for controlling a screen of an external device according to an embodiment of the present invention.

FIG. 3 is a signal flow diagram illustrating a process for controlling a screen of an external electron device according to an embodiment of the present invention.

In step 300, an electronic device 301 and an external electronic device 304 connect for communication therebetween. The communication may be performed according to at least one of Wi-Fi, BT, NFC, GPS, cellular communication (e.g., LTE, LTE-A, CDMA, WCDMA, UMTS, WiBro, GSM, or the like), etc.

In step 310, the electronic device 301 determines whether a screen control event associated with the external electronic device 304 is generated. If a screen control event is generated, the electronic device 301 transmits screen control information to the external electronic device 304 in step 320. If the screen control event is not generated, in operation 310, the electronic device 301 determines whether the screen control event associated with the external electronic device 304 is generated. In step 330, the external electronic device 304 changes a screen setting thereof according to the received screen control information.

Figure 4:
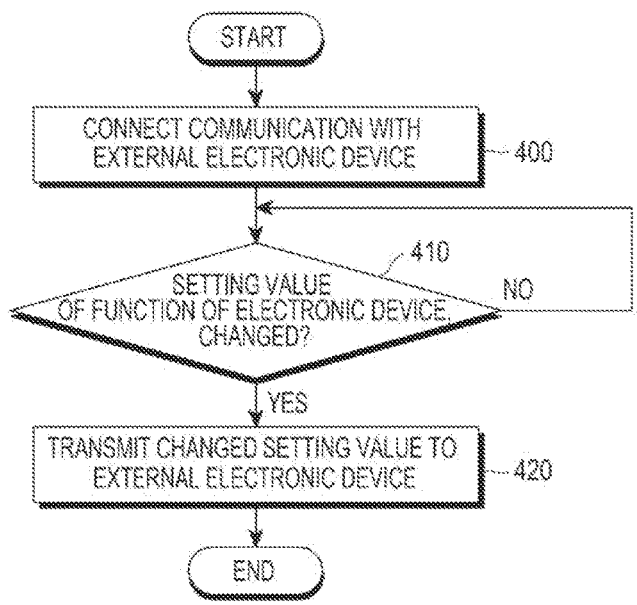
FIG. 4 is a flowchart illustrating a process for controlling a screen of an external device by an electronic device according to an embodiment of the present invention.

FIG. 4 is a flowchart illustrating a process for controlling a screen of an external electronic device by an electronic device according to an embodiment of the present invention. Specifically, the flowchart illustrated in FIG. 4 will be described with reference to the electronic device 101 illustrated in FIG. 1.

In step 400, the processor 120 connects the electronic device 101 with the external electronic device 104.

In step 410, the processor 120 determines whether a setting value of a function of the electronic device 101 is changed. When a setting value of a function of the electronic device 101 has changed, the processor 120 transmits the changed setting value of the function of the electronic device 101 to the external electronic device 104 in step 420. For example, when a setting value of a clock function of the electronic device 101 is changed, the processor 120 transmits the changed setting value of the clock function to the external electronic device 104.

In step 410, when a setting value of a function of electronic device 101 is not changed, the processor 120 may continuously determine whether the setting value of the function of the electronic device 101 is changed.

Figure 5:
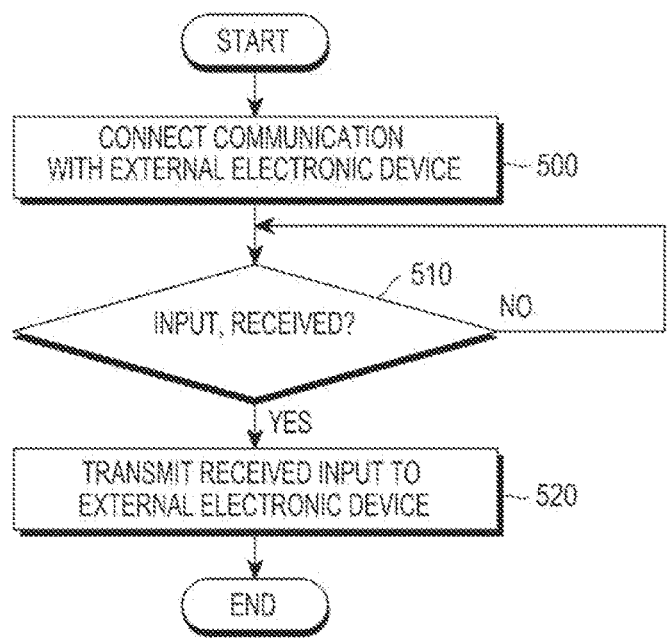
FIG. 5 is a flowchart illustrating a process for controlling a screen of an external device by an electronic device according to an embodiment of the present invention.

FIG. 5 is a flowchart illustrating a process for controlling a screen of an external electronic device by an electronic device according to an embodiment of the present invention. Specifically, the flowchart illustrated in FIG. 5 will be described with reference to the electronic device 101 illustrated in FIG. 1.

In step 500, the processor 120 connects the electronic device 101 with the external electronic device 104.

In step 510, the processor 120 determines whether an input is received from the input/output interface 140. When the input is received from the input/output interface 140, the processor 120 transmits the received input to the external electronic device 104 in step 520.

In step 510, when the input is not received from the input/output interface 140, the processor 120 may continuously determine whether an input is received from the input/output interface 140.

Figure 6:
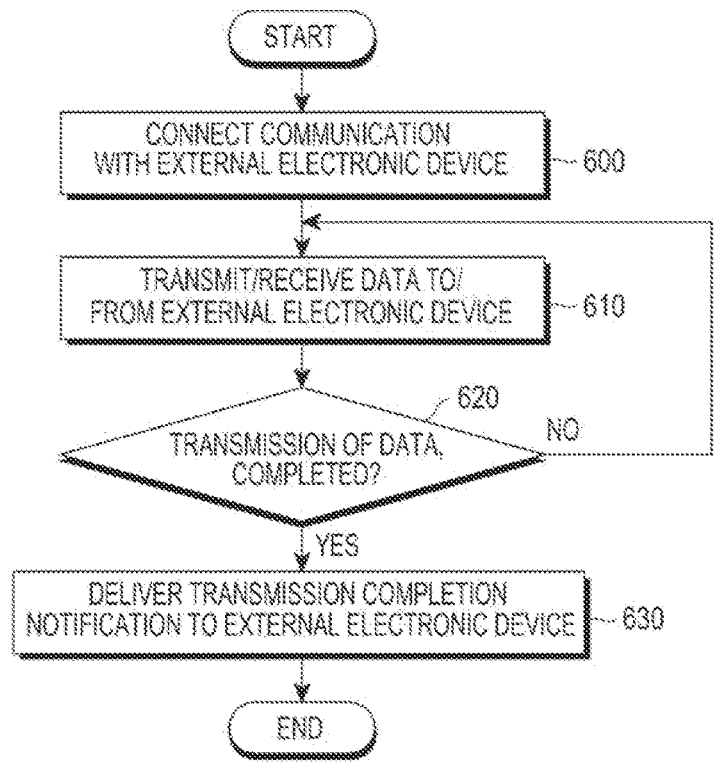
FIG. 6 is a flowchart illustrating a process for controlling a screen of an external device by an electronic device according to an embodiment of the present invention.

FIG. 6 is a flowchart illustrating a process for controlling a screen of an external electronic device by an electronic device according to an embodiment of the present invention. Specifically, the flowchart illustrated in FIG. 6 will be described with reference to the electronic device 101 illustrated in FIG. 1.

In step 600, the processor 120 connects the electronic device 101 with the external electronic device 104.

In step 610, the processor 120 transmits data to the external electronic device 104. For example, the data may include images, multimedia, text, etc.

In step 620, the processor 120 determines whether the transmission of data has been completed. When the transmission of data has been completed, the processor 120 delivers a transmission completion notification to the external electronic device 104 in step 630, notifying the external electronic device 104 of the completion of the transmission of data.

In step 620, when the transmission of data has not been completed, the process returns to step 610, and the processor 120 continuously transmits and receives data to/from the external electronic device 104.

Figure 7:
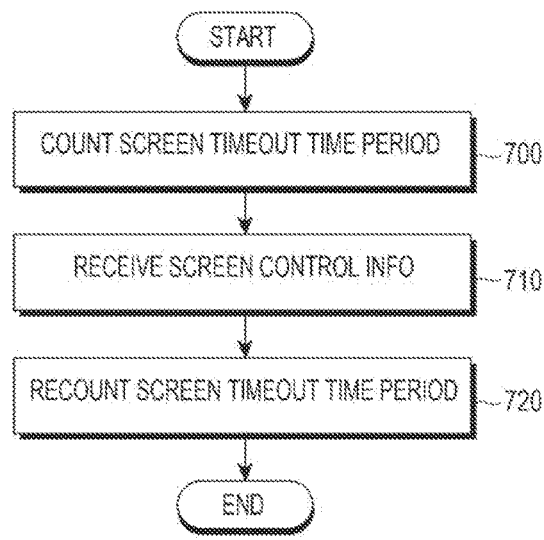
FIG. 7 is a flowchart illustrating a process for controlling a screen of an external electronic device according to an embodiment of the present invention.

FIG. 7 is a flowchart illustrating a process for controlling a screen of an external electronic device according to an embodiment of the present invention. Specifically, the flowchart illustrated in FIG. 7 will be described with reference to the external electronic device 204 illustrated in FIG. 2.

In step 700, the processor 220 counts a screen timeout time period of the display 250.

In step 710, screen control information is received from the electronic device 201.

In step 720, the processor 220 counts the screen timeout time period and then recounts.

For example, when the screen control information is received after 7 seconds (0-7 seconds) have been counted in a screen timeout time period of 10 seconds, the processor 220 recounts from 0 again.

Figure 8:
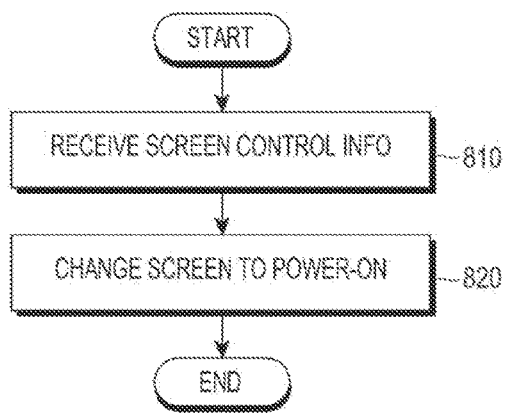
FIG. 8 is a flowchart illustrating a process for controlling a screen of an external electronic device according to an embodiment of the present invention.

FIG. 8 is a flowchart illustrating a process for controlling a screen of an external electronic device according to an embodiment of the present invention. Specifically, the flowchart illustrated in FIG. 8 will be described with reference to the external electronic device 204 illustrated in FIG. 2.

While a screen of the display 250 is in a power-off state, when screen control information is received from an electronic device 201 in step 810, the processor 220 changes the screen of the display 250 from the power-off state to a power-on state.

For example, when a transmission completion notification is received from the electronic device 201, notifying the external electronic device 204 of the completion of a transmission of data from the electronic device 201, while the screen of the display 250 of the external electronic device 204 is powered off, the processor 220 changes the screen of the display 250 from the power-off state to the power-on state, and displays the transmission completion notification on the screen.

FIG. 9 is a flowchart illustrating a process for controlling a screen of an external electronic device according to an embodiment of the present invention. Specifically, the flowchart illustrated in FIG. 9 will be described with reference to the external electronic device 204 illustrated in FIG. 2.

In step 900, screen control information is received from the electronic device 201.

In step 910, the processor 220 changes a screen timeout time period for a particular function based on the received screen control information. For example, when a changed setting value of a wallpaper function is received from the electronic device 201, the processor 220 may store the changed setting value of the wallpaper function, and may change a screen timeout time period to a time period corresponding to the setting value, when the wallpaper function is performed. For example, when a screen timeout time period is currently set to 10 seconds and a request for displaying the wallpaper is made, the processor 220 may change the time period for displaying the wallpaper according to the changed setting value (e.g., 5 seconds) for the wallpaper function, and may display the wallpaper on the screen during the changed time period.

In step 920, the processor 220 counts the changed screen timeout time period while a particular function is performed. For example, when a time period for displaying the wallpaper is changed to 5 seconds, the processor 220 may count the screen timeout time period for 5 seconds from a time point of displaying the wallpaper on the screen, and may turn off power of the screen after 5 seconds has elapsed.

FIG. 10 illustrates examples of screen timeout time periods matched to screen control events according to an embodiment of the present invention.

Referring to FIG. 10, examples of the screen control event include events for changing function setting values of the electronic device, which include a data transmission completion event, the setting of a wallpaper, the setting of a clock type, the setting of a home screen, the change of a detailed setting of each application and the change of a background color, a live wallpaper setting change event, a software update event, an application installation event, an input event, a connection/disconnection event, and a music control event, and a screen timeout time period is set for each event.

Information including the screen timeout time periods, which are matched to the screen control events, may be stored in the memory 130 of the electronic device 101, or in the memory 230 of the external electronic device 204.

At least part of a device (for example, modules or functions thereof) or a method (for example, operations) according to the above-described embodiments of the present invention may be embodied by, for example, an instruction stored in a computer readable storage medium provided in a form of a programming module. When the instructions are performed by at least one processor (e.g., the processor 120), the at least one processor may perform functions corresponding to the instructions. The computer readable storage media may be, for example, the memory 120. At least a part of the programming module may be implemented (for example, executed) by, for example, the processor 120. At least a part of the programming module may include, for example, a module, a program, a routine, and a set of instructions and/or a process for performing one or more functions.

The computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction (for example, programming module), such as a Read Only Memory (ROM), a Random Access Memory (RAM), a flash memory, etc. Further, the program commands may include high class language codes that can be executed in a computer by using an interpreter, as well as machine language codes that are made by a compiler. The aforementioned hardware device may be configured to operate as one or more software modules in order to perform the operation of various embodiments of the present invention, and vice versa.

A programming module according to the present invention may include at least one of the described component elements, a few of the component elements may be omitted, or additional component elements may be included. Operations executed by a module, a programming module, or other component elements according to various embodiments of the present disclosure may be executed sequentially, in parallel, repeatedly, or in a heuristic manner. Also, a few operations may be executed based on a different order, may be omitted, or may additionally include another operation.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method of controlling a screen in an external electronic device, the method comprising:
   connecting with an electronic device;
   receiving, from the electronic device, screen control information for controlling the screen of the external electronic device;
   determining whether a screen of the external electronic device is in an on state or an off state;

if the external electronic device is in the on state, changing a setting of the screen of the external electronic device according to the received screen control information;

recounting a timeout time period of the screen of the external electronic device based on the changed setting of the screen of the external electronic device; and if the external electronic device is in the off state, changing the screen of the external electronic device from the off state to the on state.

2. The method of claim 1, wherein the screen control information comprises at least one of:

a changed setting value of a function of the electronic device;

input information from the electronic device; and notification information that notifies the external electronic device of completion of data transmission between the external electronic device and the electronic device.

3. The method of claim 1, further comprising counting the timeout time period of the screen of the external electronic device, while receiving the screen control information for controlling the screen of the external electronic device is received from the electronic device.

4. The method of claim 3, wherein the received screen control information comprises information for restarting the counting of the timeout time period of the screen of the external electronic device.

5. The method of claim 1, wherein changing the setting of the screen according to the received screen control information comprises:

changing a screen timeout time period for a particular function; and counting the changed screen timeout time period, when the particular function is performed.

6. An external electronic device comprising:

a communication interface that connects with an electronic device; and a processor configured to receive, from the electronic device, screen control information for controlling the screen of the external electronic device, determine whether a screen of the external electronic device is in an on state or an off state, if the external electronic device is in the on state, change a setting of a screen of the external electronic device according to received screen control information, recount a timeout time period of the screen of the external electronic device based on the changed setting of the screen of the external electronic device, and if the external electronic device is in the off state, change the screen of the external electronic device from the off state to the on state.

7. The external electronic device of claim 6, wherein the screen control information comprises at least one of:

a changed setting value of a function of the electronic device;

input information from the electronic device; and notification information that notifies the external electronic device of completion of data transmission between the external electronic device and the electronic device.

8. The external electronic device of claim 6, wherein the processor changes a screen timeout time period for a particular function and count the changed screen timeout time period, when the particular function is performed.

9. The external electronic device of claim 6, wherein the processor is further configured to count the timeout time period of the screen of the external electronic device while the screen control information for controlling the screen of the external electronic device is received from the electronic device.

10. The external electronic device of claim 9, wherein the received screen control information comprises information for restarting a counting of the timeout time period of the screen of the external electronic device.

* * * * *